United States Patent [19]

Tanaka et al.

[11] Patent Number: 4,723,258
[45] Date of Patent: Feb. 2, 1988

[54] COUNTER CIRCUIT

[75] Inventors: Hideo Tanaka; Ichiro Kuroda, both of Tokyo, Japan

[73] Assignee: NEC Corporation, Tokyo, Japan

[21] Appl. No.: 840,820

[22] Filed: Mar. 18, 1986

[30] Foreign Application Priority Data

Mar. 18, 1985 [JP] Japan .................................. 60-53659

[51] Int. Cl.⁴ ...................... H03K 21/02; H03K 23/58; H03K 23/62
[52] U.S. Cl. .................................... 377/111; 377/116; 377/123
[58] Field of Search ................... 377/49, 55, 107, 111, 377/116, 117, 123; 364/770

[56] References Cited

U.S. PATENT DOCUMENTS

| | | | |
|---|---|---|---|
| 3,402,283 | 9/1968 | D'Izarn | 377/49 |
| 3,505,511 | 4/1970 | Campano et al. | 364/770 |
| 3,675,000 | 7/1972 | Lincoln et al. | 364/770 |
| 3,989,940 | 11/1976 | Kihara | 364/770 |
| 4,075,464 | 2/1978 | Davies, Jr. | 377/55 |
| 4,218,750 | 8/1980 | Carter | 377/111 |
| 4,280,190 | 7/1981 | Smith | 364/770 |
| 4,486,851 | 12/1984 | Christopher et al. | 377/55 |

Primary Examiner—John S. Heyman
Attorney, Agent, or Firm—Sughrue, Mion, Zinn, Macpeak & Seas

[57] ABSTRACT

A multi-digit counter circuit performs both successive data production function and non-successive data production. Successive data is produced by an increment or decrement operation according to a first carry (borrow) signal. Non-successive data is produced by a control circuit which applies a second carry (borrow) signal independently of the first carry (borrow) signal to an arbitrary selected digit or digits. The arbitrary digit is designated according to the distance between the preceding data and the following data to be produced.

5 Claims, 7 Drawing Figures

COUNTER CIRCUIT

BACKGROUND OF THE INVENTION

1. Field of the Invention

The present invention relates to a counter circuit, and more particularly to a counter circuit having an addition function and/or a subtraction function, which is applicable to an address generator or a general counter.

2. Description of the Prior Art

With the advance of a large scale integrated circuit (LSI) technology, a microprocessors capable of a high-speed operation has been provided. Such microprocessors are required in a field of complex data processing, for example, signal processing. A signal processor can be used to manipulate a large amount of data, such as voice or image data. Specific operations such as the fast Fourier transform (FFT) operations and filtering operation are often required, in which both successive data access and non-successive data access are operatively used. Successive data access is performed by a well known program counter in which the content (counted value) is incremented or decremented count by count. However, non-successive data access requires a complex hardware circuit.

In detail, the FFT operation employs a product-sum operation which is accomplished in the prior art by storing a plurality of data in a memory (e.g. RAM) and by retrieving two units of data at a predetermined time interval. The retrieved data are multiplied together by a multiplier. Each product produced by the multiplier is integrated (accumulated), sequentially.

In this operation, two kinds of data access operations are operatively used. One is the successive data access operation by which two units of data are retrieved from two successive address locations of the memory. The other is the non-successive data access operation by which data from non-successive address locations of the memory are retrieved. The former is performed by using the program counter as mentioned above. I contrast, the prior art, the latter requires a specific address counter. Such address counter, for instance, must produce an address which is incremented or decremented by $2^n$. The program counter of the prior art can not produce non-successive addresses by itself. Therefore, an adder or a subtracter is required to produce the non-successive addresses.

However, address production by means of the adder or the subtractor requires a long period of time and is unsuitable for signal processing operations which require high-speed operation. Further, since the adder or the subtractor was provided independently of the product-sum operating unit, the number of hardware elements to be employed in the signal processor was increased. Thus, it becomes difficult to form the signal processor on a single semiconductor chip.

Non-successive data production is required not only in the address operation but also in numerical operations or general (or special) purpose digital data operations. The counter of the prior art has not been successful in increasing the speed of operation beyond a certain limit determined by the technology of the adder or the subtracter.

It is an object of the present invention to provide a counter circuit which can produce non-successive data at a high-speed.

It is another object of the present invention to provide a novel counter which can operatively produce successive and non-successive data.

Still another object of the present invention is to provide a counter circuit which can be formed on a signal processor chip with a small size.

SUMMARY OF THE INVENTION

A counter circuit of the present invention comprises a plurality of digit blocks, each block having an increment (or decrement) circuit which performs an increment (decrement) operation using a first carry (borrow) signal, and a control means for applying a second carry (borrow) signal directly to the increment (or decrement) circuit of an arbitrary block. The second carry (borrow) signal is generated independently from the first carry signal and is applied to the arbitrary block when non-successive data is to be produced. When the second carry (borrow) signal is applied to the arbitrary block, the transfer of the first carry (borrow) signal from the preceding block to the arbitrary block is inhibited. Thus, the arbitrary digit is selectively incremented (or decremented) to produce non-successive data.

According to the present invention, the required non-successive data can be produced at high speed without using an adder or a subtracter. Therefore, in many application fields, the present invention is more effective than the prior art device.

DETAILED DESCRIPTION OF THE INVENTION

Figure 1:
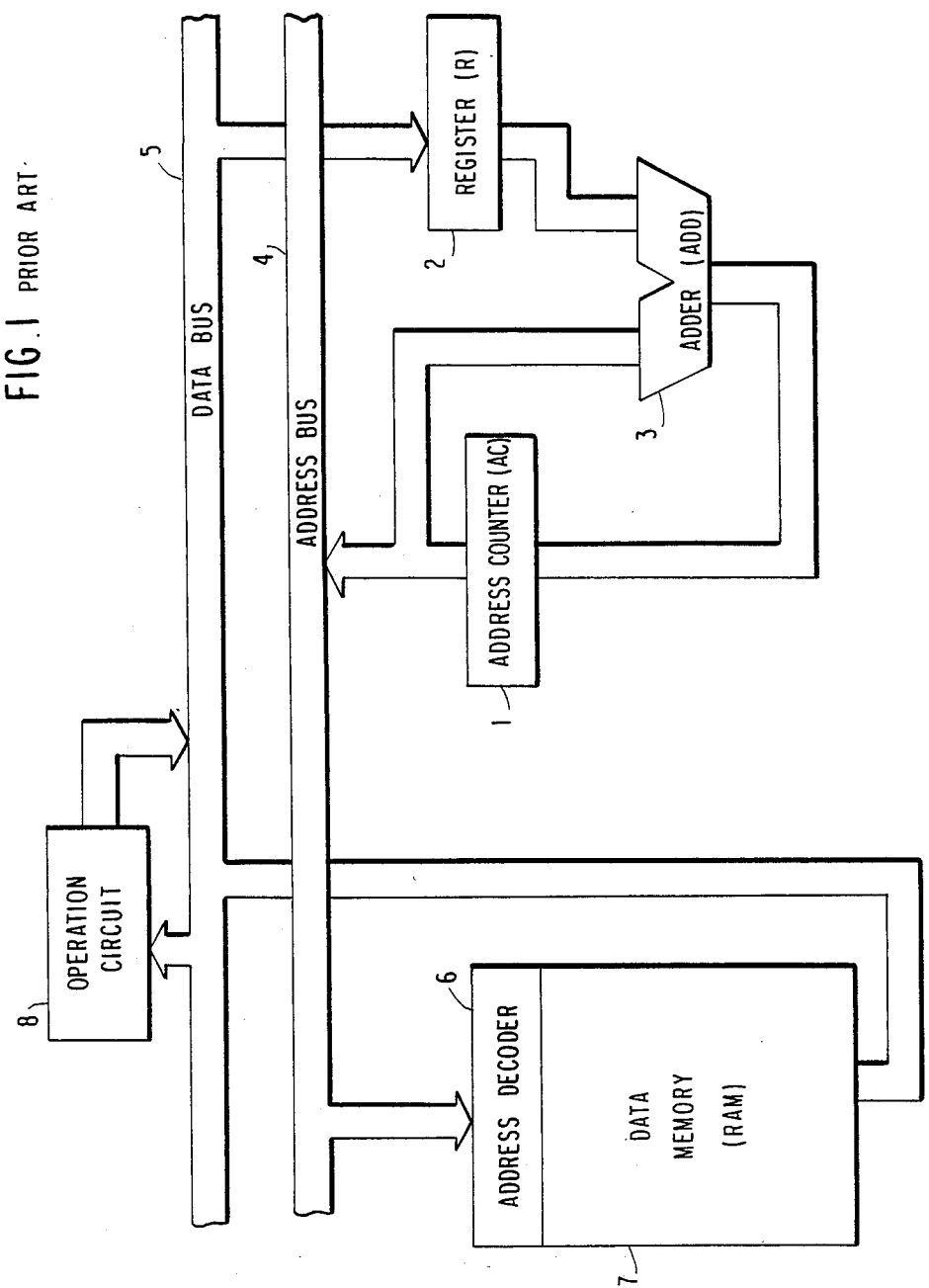
FIG. 1 is a block diagram of a signal processor in which a counter circuit of the prior art is employed.

First, a counter circuit of the prior art will be described by reference to FIG. 1 which shows a block diagram in an essential part in a signal processor employing the prior art counter circuit as an address generating circuit. In the prior art, the address generating circuit comprises an address counter 1, a register 2 and an adder 3. A conventional counter circuit is utilized to provide the address counter 1. Therefore, the address counter 1 has an increment (or decrement) function which produces successive addresses. That is, the address counter 1 can change its content sequentially (e.g. n, n±1, n±2, n±3, . . . ). The addresses produced by the address counter 1 are sequentially transferred to an address decoder 6 through an address bus 4. Each address is decoded by the address decoder 6 and is used to read data out of a data memory (RAM) 7. The read-out data is transferred to an operation circuit 8 for signal processing (e.g. the FFT operation, a filtering operation) via a data bus 5. In this mode, the addresses applied to the data memory 7 are incremented by +1 or −1.

Thus, successive addresses are produced at a predetermined time interval.

The address counter 1, however, can not produce non-successive addresses (e.g. n, n±a, n±2a, n±3a, . . . ) by itself. Therefore, a register 2 for storing the value a and the adder (or subtracter) 3 are required. The adder 3 receives the content n of the address counter 1 and the value a of the register 2 and performs an addition (or subtraction) operation. The result (n±a) is stored in the address counter 1, and thereafter the value (n±a) is transferred to the address decoder 6 through the address bus 4 and is also transferred to the adder 3 to produce the next address (n±2a). These operations are repeated at a predetermined time interval.

Figure 2:
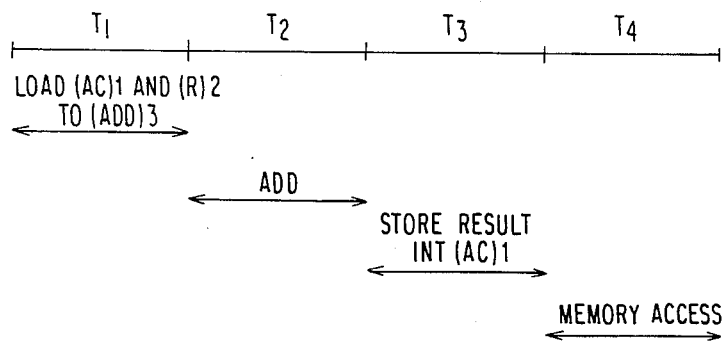
FIG. 2 is a timing chart of address production according to the counter circuit of the prior art.

As described above, the counter circuit of the prior art requires complex procedures and hardware circuits. Further, at least four cycles are required to produce non-successive addresses as shown in FIG. 2. First cycle $T_1$ is used to load contents of the address counter (AC) 1 and the register (R) 2 to the adder (ADD) 3. In second cycle $T_2$, the add operation is executed. The result of the add operation is stored in the address counter (AC) 1 in a third cycle $T_3$. Thereafter, a memory access can be permitted in a fourth cycle $T_4$. Therefore, a long period of time must be spent in accessing the data memory in the non-successive address mode.

Figure 3:
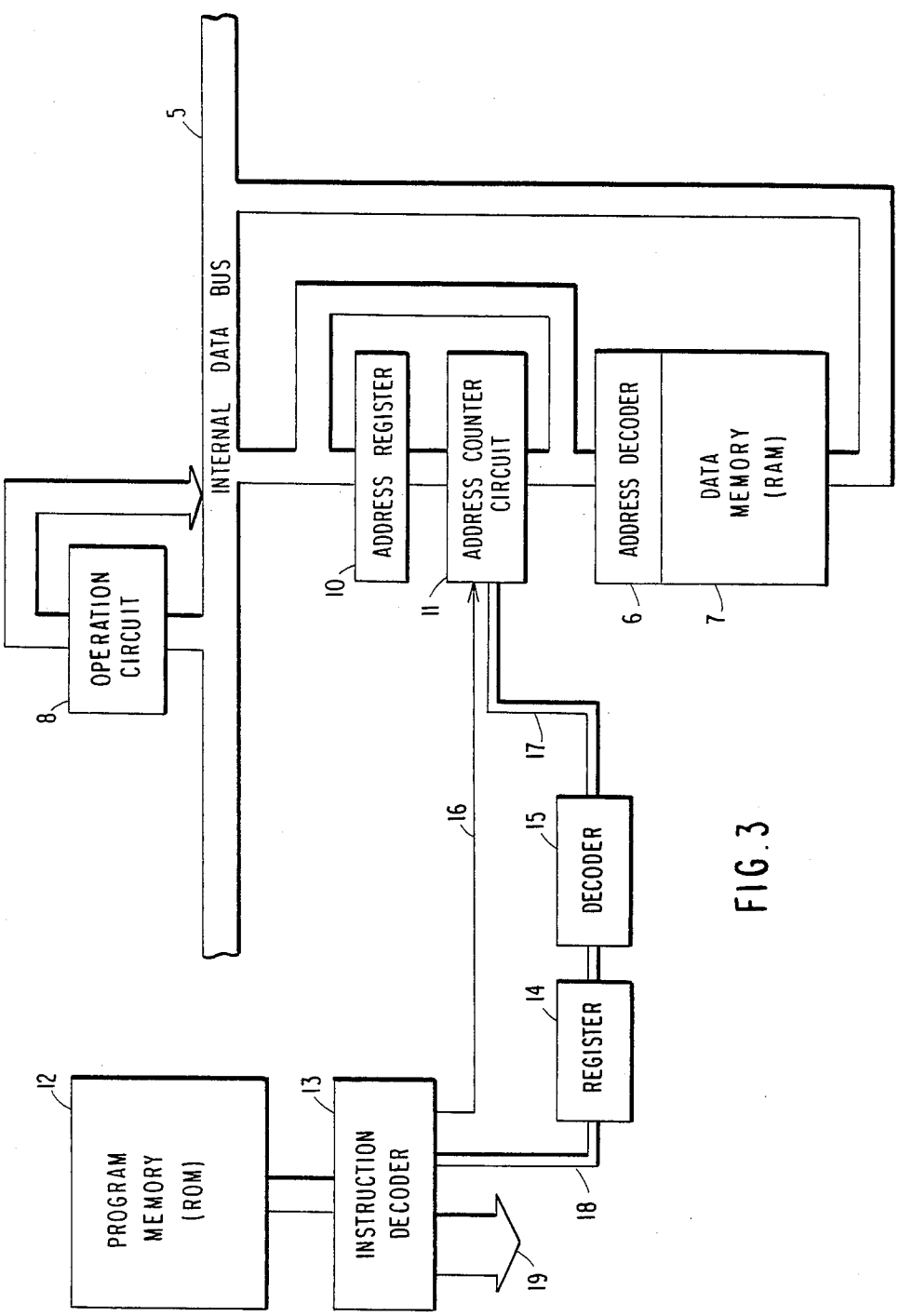
FIG. 3 is a block diagram of a signal processor in which a counter circuit of one embodiment according to the present invention is employed.

FIG. 3 is a block diagram of an important part of a signal processor circuit formed on a single semiconductor chip in which a counter of the present invention is used as an address producing means. As mentioned above, the data memory (RAM) 7 stores a plurality of data to be used in signal processing. An address produced by an address counter circuit 11 is decoded in the address decoder 6. As a result, data required for signal processing is read out of the data memory (RAM) 7 and is transferred to the operating circuit 8 capable of performing the FFT operation, a filtering operation, or the like. The address counter circuit 11 contains an essential part of the counter circuit according to the present invention and is illustrated in more detail in FIG. 5. An input end of the address counter circuit 11 is coupled to an address register 10, while an output end is coupled to the address decoder 6 and to the address register 10. The address counter circuit 11 further receives an INC/DEC signal 16 indicating an increment/decrement operation and an output 17 of a decoder 15. Address production is commanded by an instruction stored in a program memory (ROM) 12. When address production is required, the instruction is read out of the program memory 12 and is decoded by an instruction decoder 13.

Figure 4:
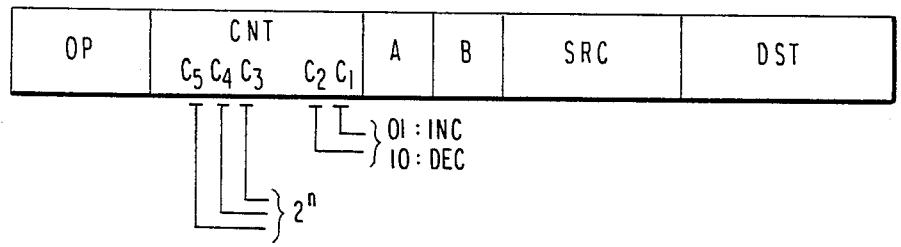
FIG. 4 illustrates the instruction format of an instruction code commanding an address production.

A format of the instruction code is illustrated in FIG. 4. In this embodiment, a horizontal microprogram system is employed. As shown in FIG. 4, the instruction code contains six fields, that is, an operand field (OP) designating the kind of operation, a control field (CNT), register designation fields (A and B) designating registers in which data to be operated upon are stored, a source register field (SRC), and a destination register field (DST). The SRC and DST fields are used to execute a data transfer instruction between registers. It should be noted that address production is commanded by reference to the control field (CNT) in this embodiment. Two bits ($C_1$ and $C_2$) in the CNT field are assigned to indicate the increment (INC) operation and a decrement (DEC) operation, respectively. Three bits ($C_3$ to $C_5$) are assigned to indicate information for producing a non-successive address.

Figure 5:
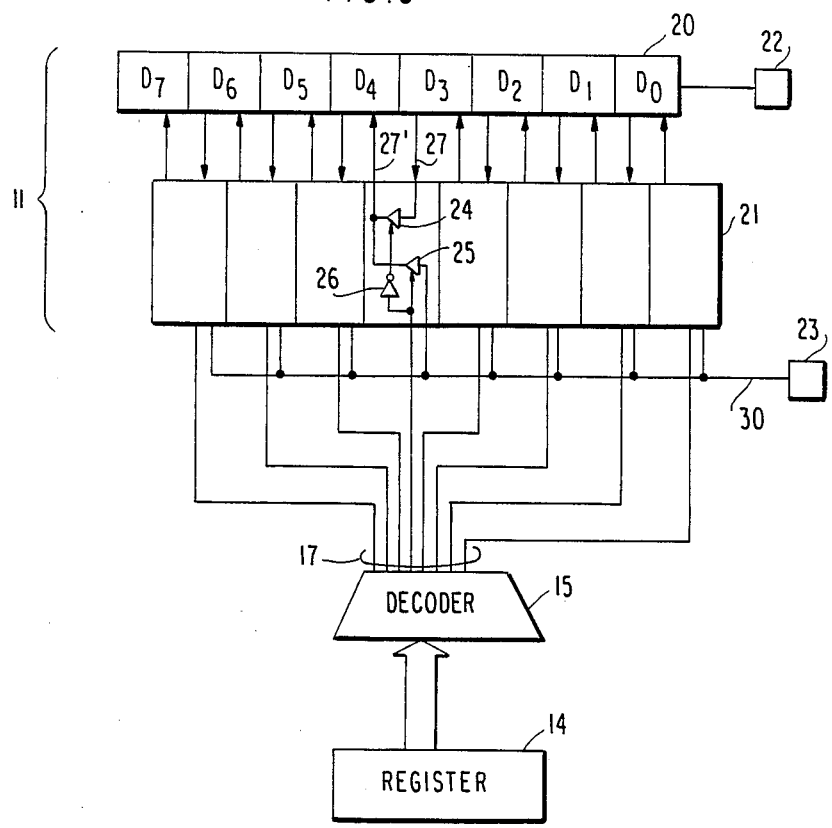
FIG. 5 is a block diagram of the counter circuit in FIG. 3.

Referring to FIG. 5, the address production of this embodiment will be described in detail. The address counter circuit 11 of FIG. 3 has a program counter 20 and a carry (or borrow) control circuit 21. The program counter 20 may also be referred to as an incrementer (or decrementer) and has eight digits $D_0$ to $D_7$ in this embodiment. An input portion (not shown) is coupled to the address register 10 and an output portion (not shown) is coupled to the address decoder 6 and an input portion of the address register 10. The program counter 20 is connected to a first (internal) carry (borrow) source 22 generating a carry (or borrow) signal. The first carry (borrow) signal is transferred (or propagated) from the least significant digit $D_0$ to the most significant digit $D_7$ in series through a carry (borrow) signal line. the program counter 20 receives start data from the address register 10 or resets to "0" at an initial state. Thereafter, the content of the program counter 20 is sequentially incremented (or decremented) by one in response to a clock or other predetermined timing signal. Thus, successive addresses are sequentially produced. In this mode, the first (internal) carry (borrow) signal is transferred from $D_0$ to $D_7$ as needed. This increment or decrement operation of the program counter is well known in the art.

The feature of the present invention is the carry (borrow) control circuit 21 coupled to the program counter 20. The carry (borrow) control circuit 21 has eight blocks corresponding to the respective digits. Each block has the same circuit design and includes two switching gates (or switching buffers) 24 and 25 and an inverter 26. The gate 24 is positioned between digits and couples the carry (borrow) signal line 27 of the preceding digit to the signal line 27 of the following digit. An input end of each gate 25 is connected to a second (external) carry (or borrow) signal generating source 23 in common. An output end of the gate 25 is connected to the carry (borrow) signal line 27 to which an output end of the gate 24 is connected as shown in FIG. 5.

The gates 24 and 25 are exclusively selected by an output 17 of the decoder which decodes the content of the register 14. The content to be decoded is the bits $C_3$ to $C_5$ of the CNT field as described above. In a block receiving a low level signal as an output signal from the decoder 15, the gate 24 is selected and is turned on by the output of the inverter 26. At this time the gate 25 is electrically turned off. Thus, the carry (borrow) signal from the preceding digit is transferred to the following digit. On the other hand, when the output signal of the decoder is a high level signal, the gate 24 is turned off and the gate 25 is turned on. Therefore, transfer of the carry (or borrow) signal from the preceding digit is inhibited, while the second carry (borrow) signal from the source 23 is applied to the following digit.

According to the present invention, the second carry (borrow) signal is applied to an arbitrary digit to produce a non-successive address, which digit is designated by the information supplied to the register 14 from, e.g. the program memory 12.

As an example, it is assumed that the address of the program counter is "00101010" (binary number)="42" (decimal number) and that the address "58" (decimal number) is required as the next address to be sent to the data memory 7. In this case, the successive address operation can not be employed. Therefore, the non-successive address operation is selected. The distance between the address "42" and the address "58" is "16" ($=2^4$).

According to the present invention, the carry control circuit 21 is used to produce the address "58". In the embodiment, "16" is indicated by the bits $C_3$ to $C_5$ in the CNT field. The decoder decodes the bits $C_3$ to $C_5$ which represent "1", "0", "0". Decimal number "16" is represented by "00010000" (binary number). Therefore, the decoder 15 generates the output (00010000) signal. Consequently, the gate 24 between $D_3$ and $D_4$ is turned off and the gate 25 connected to $D_4$ is turned on. Therefore, the second carry signal is applied to $D_4$, then the content of the address counter becomes "00111010" (decimal number "58") immediately.

Figure 6:
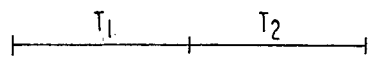
FIG. 6 is a timing chart of address production according to the counter circuit shown in FIG. 5.

As described above, according to the present invention the adder 3 and the register 2 connected to the adder 3 are not required. Further, by means of the second carry control signal the add operation can be substantially executed. Therefore, non-successive address production can be performed in only two cycles as shown in FIG. 6.

Figure 7:
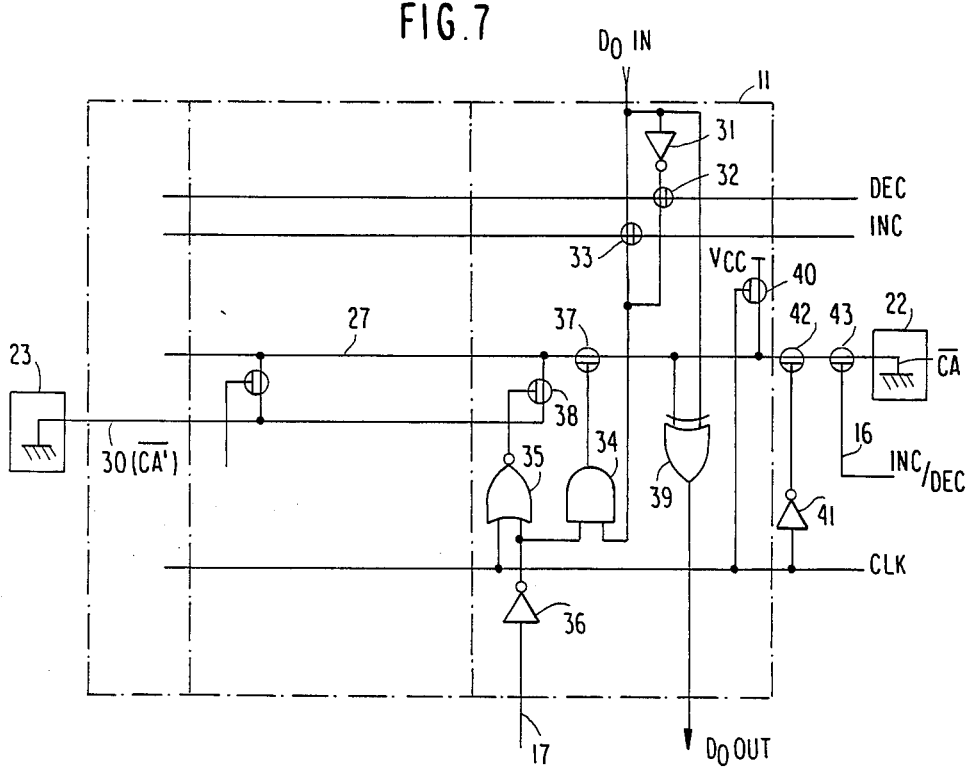
FIG. 7 is a circuit diagram illustrating details of the counter circuit in FIG. 5.

FIG. 7 shows a more detailed circuit diagram of the least significant digit block in the address counter circuit 11. The remaining digit block or blocks may be the same in the circuit design as least significant block. Bit data $D_{0IN}$ is applied from the address register 10. When an increment operation is commanded, a gate (transistor) 33 is turned on according to an increment control signal (INC) which is also generated by the instruction decoder 13. The input data $D_{0IN}$ is applied to an AND gate 34. When a decrement operation is commanded, a gate 32 is turned on by a decrement control signal generated by the instruction decoder 13. Thus, the data inverted by an inverter 31 is applied to the AND gate 34. The first carry (or borrow) signal generating source 22 generates a first carry (borrow) signal $\overline{CA}$. This signal is transferred to the block when the INC/DED signal 16 is at a higher level and when a clock CLK is at a low level. When the clock (CLK) is at the high level, the carry (borrow) signal line 27 is precharged to $V_{cc}$ (high) level through a precharge transistor 40. In this state, if the INC/DEC signal 16 is applied to the gate 43, the line 27 in the least significant block assumes the low level. In this case, the low level is used as the active level of the carry (borrow) signal. An exclusive OR (EXOR) gate 39 is connected to the input data $D_{0IN}$ and the carry (borrow) signal line 27 to add or subtract the input data to the supplied carry (or borrow). In the successive address mode, the EXOR gate 39 receives the first carry (borrow) signal. At this moment, a switching gate 37 (corresponding to 24 of FIG. 5) is controlled in accordance with the input data $D_{0IN}$ because the output signal 17 from the decoder 15 is at a low level. If the input data is "1" in the increment operation of the successive address mode, the gate 37 is turned on. Thus, the carry signal is transferred to the following block. If the input data is "0", the gate is turned off, and the carry signal is not transferred to the following block. However, the output of the EXOR gate 39 becomes "1".

In the non-successive address mode, if the output signal 17 is at the high level, the gate 37 is necessarily turned off. Then, as an output of an NOR gate 35 becomes high, the switching gate 38 (corresponding to 25 of FIG. 5) is turned on. Thus, the carry signal (CA') is applied to the following block from the second carry (borrow) signal generating source 23. Consequently, an arbitrary digit of the address counter is modified by using the second carry (borrow) signal in accordance with the data to be added (or subtracted) which is decoded in the decoder. That is, the add or subtract operation is performed by the address counter circuit without using an adder or a subtracter.

As described above, a high-speed counting operation can be obtained in both the successive data mode and the non-successive data mode by simple hardware equipment. The present invention can also be applied to general purpose or special purpose data processors.

What is claimed is:

1. A counter circuit, comprising;
   counter means including a plurality of ordered stages, each of said stages except for a highest ordered stage including a carry signal input end and a carry signal output end, and said highest ordered stage including a carry signal input end;
   a plurality of first switching means, each being coupled between said carry signal output end of a lower ordered stage and said carry signal input end of a following higher ordered stage for transferring a carry signal from said lower ordered stage to said higher ordered stage when actuated;
   means for generating a control signal;
   a plurality of second switching means, each being coupled between a carry signal input end of each stage and said control signal generating means for transferring said control signal to the associated stage when actuated; and
   means for actuating one or ones of said plurality of said second switching means so as to couple said control signal to a selected stage or stages, and for actuating those of said first switching means associated with carry signal input ends of the remaining, non-selected stages.

2. The circuit of claim 1, wherein those ones of the first and second switching means coupled to the carry signal input end of the same stage are complementarily actuated and deactuated.

3. A circuit as claimed in claim 1, in which said actuating means comprises register means for storing information designating at least one stage, and decoder means for decoding the information stored in said register means to output first actuating signal means for actuating that one of said second switching means which is connected to the carry signal input end of each designated stage.

4. A circuit as claimed in claim 3, wherein said decoder means further generates one or more second deactuating signals for deactuating those of said second switching means connected to the carry signal input ends of non-designated stages.

5. A circuit as claimed in claim 4, wherein said actuating means further includes means for deactuating the first switching means connected to the carry signal input end of each said designated stage in response to said first actuating signal means and for actuating the first switching means connected to the carry signal input end of each said non-designated stage in response to said second deactuating signal.

* * * * *

UNITED STATES PATENT AND TRADEMARK OFFICE
CERTIFICATE OF CORRECTION

PATENT NO. : 4,723,258

DATED : February 2, 1988

INVENTOR(S) : TANAKA ET AL

It is certified that error appears in the above-identified patent and that said Letters Patent is hereby corrected as shown below:

Column 1, line 13, delete "a microprocessors capable of a high-" insert --microprocessors capable of high- --

Column 1, line 14, delete "has been" and insert --have been--

Column 1, line 42, delete "I" and insert --In--

Column 3, lines 5 and 6 delete "value a" insert --value $\underline{a}$--

Column 3, line 7, delete "content n" insert --content $\underline{n}$--

Column 3, line 8, delete "value a" insert --value $\underline{a}$--

Column 5, line 35, delete "INC/DED" insert --INC/DEC--

Column 5, line 63, delete "(CA')" insert --($\overline{C}\overline{A}'$)--

Signed and Sealed this

Twenty-first Day of February, 1989

*Attest:*

DONALD J. QUIGG

*Attesting Officer*     *Commissioner of Patents and Trademarks*